(12) United States Patent
Popczynski et al.

(10) Patent No.: US 9,396,019 B2
(45) Date of Patent: Jul. 19, 2016

(54) MANAGEMENT COMMUNICATION

(75) Inventors: Przemyslaw Popczynski, Wroclaw (PL); Piotr Tomczak, Wroclaw (PL); Krzysztof Biernat, Wroclaw (PL); Maciej Setkowski, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 314 days.

(21) Appl. No.: 13/639,550

(22) PCT Filed: Apr. 12, 2010

(86) PCT No.: PCT/EP2010/054755
§ 371 (c)(1),
(2), (4) Date: Oct. 5, 2012

(87) PCT Pub. No.: WO2011/127957
PCT Pub. Date: Oct. 20, 2011

(65) Prior Publication Data
US 2013/0024568 A1    Jan. 24, 2013

(51) Int. Cl.
*G06F 15/173* (2006.01)
*G06F 9/48* (2006.01)
*H04L 12/26* (2006.01)
(Continued)

(52) U.S. Cl.
CPC .......... *G06F 9/4843* (2013.01); *H04L 12/2697* (2013.01); *H04L 41/044* (2013.01); *H04L 41/0896* (2013.01); *H04L 43/0882* (2013.01); *H04L 43/0888* (2013.01);
(Continued)

(58) Field of Classification Search
None
See application file for complete search history.

(56) References Cited

U.S. PATENT DOCUMENTS 6,480,901 B1 * 11/2002 Weber ................ H04L 41/0213
                                            709/223
7,062,540 B2 * 6/2006 Reddy ..................... G06F 9/542
                                            709/201
(Continued)

FOREIGN PATENT DOCUMENTS

| DE | EP 1947802 A1 * | 7/2008 | ............ H04L 41/044 |
| EP | 1947802 A1 * | 7/2008 | .............. H04L 12/24 |
| JP | 2007-074218 A | 3/2007 | |

OTHER PUBLICATIONS

English translation of Notification of Reasons for Refusal dated Sep. 9, 2013 corresponding to Japanese Patent Application No. 2013-504127.

(Continued)

*Primary Examiner* — Ranodhi Serrao
*Assistant Examiner* — James Fiorillo
(74) *Attorney, Agent, or Firm* — Squire Patton Boggs (US) LLP

(57) ABSTRACT

The present invention relates to methods and apparatus for improving management communication. One or more performance parameter measurements may be received by a throughput optimisation system wherein the one or more performance parameters relate to one or more communication links between one or more management applications and one or more managed entities, and the one or more performance parameters provide an indication of a performance of the one or more communication links. The throughput optimisation system may adapt one or more system parameters for the one or more management applications which are performing one or more active management tasks based on the received one or more performance parameters relating to the one or more communication links.

11 Claims, 2 Drawing Sheets

(51) Int. Cl.
*H04L 12/24* (2006.01)
*G06F 9/54* (2006.01)

(52) U.S. Cl.
CPC ................ *G06F 9/542* (2013.01); *H04L 41/08* (2013.01); *H04L 41/0816* (2013.01)

(56) References Cited

U.S. PATENT DOCUMENTS

| | | | | |
|---|---|---|---|---|
| 8,050,191 | B2* | 11/2011 | Tirpak | G06Q 10/00 370/252 |
| 8,489,720 | B1* | 7/2013 | Morford | H04L 41/0896 709/223 |
| 8,768,327 | B2* | 7/2014 | Biernat | H04L 12/24 455/418 |
| 2002/0087623 | A1* | 7/2002 | Eatough | H04L 12/2697 709/203 |
| 2002/0165961 | A1* | 11/2002 | Everdell | H04L 41/22 709/225 |
| 2004/0266442 | A1* | 12/2004 | Flanagan | H04W 16/18 455/445 |
| 2009/0183162 | A1* | 7/2009 | Kindel | G06F 9/4843 718/103 |
| 2013/0039196 | A1* | 2/2013 | Bodog | H04L 12/24 370/252 |

OTHER PUBLICATIONS

Kiyohito Yoshihara, et al.; "Dynamic Load Balancing for Distributed Network Management"; vol. J86-B; No. 3; pp. 438-448; Mar. 2003.
Japanese Notice of Allowance Decision to Grant application No. 2013-504127 dated Mar. 26, 2014.
International Search Report and Written Opinion dated Dec. 28, 2010 corresponding to International Patent Application No. PCT/EP2010/054755.

* cited by examiner

MANAGEMENT COMMUNICATION

The present invention relates to improving management communication and, in particular, to effectively manage and monitor communication between controlled entities and management applications.

Currently, there are many large scale networks that include network entities for performing various functionality and management systems for managing and controlling the network entities. For example, in telecommunication networks the network entities are typically network elements and the management systems include, amongst others, Element Management Systems (EMS) and Network Management Systems (NMS). Other examples include Energy Supply Networks, Operation and Maintenance Systems and so on. As a person skilled in the art will appreciate, there are numerous different networks that exist which include network entities and management systems to manage those network entities.

The management systems typically include several applications which are responsible for managing and controlling different aspects and areas of the associated network. In most cases, the applications have to communicate with the network entities to receive data from the network entities and also to transmit data to the network entities. In large scale networks, the necessary communication between the management applications on the management system and the network entities deployed in the network causes a significant amount of data traffic, e.g. throughput, along with significant bandwidth requirements which may cause performance and resource problems in the network.

Thus, there is a need to efficiently and effectively monitor and control the communication between management applications on a management system and the managed network entities.

According to a first aspect of the present invention there is provided a method comprising the steps of receiving one or more performance parameter measurements wherein the one or more performance parameters relate to one or more communication links between one or more management applications and one or more managed entities, and the one or more performance parameters provide an indication of a performance of the one or more communication links; and adapting one or more system parameters for the one or more management applications which are performing one or more active management tasks based on the received one or more performance parameters relating to the one or more communication links.

Accordingly, in many of the embodiments the performance of the communication links between a management system and the managed entities may be monitored using the received one or more performance parameter measurements. Based on the received performance parameter measurements the system parameters may be adapted for each of the management applications that are performing an active management task. In other words, based on the measured performance of the communication links the system parameters may be adapted on a management application level thereby improving the efficiency and utilisation of the communication links between the management system, which includes the management applications, and the managed entities.

The performance parameters may relate to any aspect of the communication links which may affect the communication between the management applications and the managed entities. For example, the performance parameters may indicate the current bandwidth usage, the available bandwidth, the current throughput, link quality (e.g. the number of lost packets) and so on. As will be appreciated the performance parameters may relate to any aspect of the communication links and to the purpose of the network.

The performance parameters, which may also be known as Key Performance Indicators (KPI), may be predefined so that the relevant performance parameters for the type of network can be measured. The performance parameters defined may relate to KPIs common to all management applications. These common KPIs may be measured by a measuring system. The performance parameters defined may also relate to KPIs that are specific to one or more of the management applications. The KPIs specific to each particular management application may be measured by the particular management application.

The performance parameter measurements may be taken continuously or at any predetermined time period suitable for adequately measuring the performance parameters, e.g. 5 seconds, 10 seconds, 30 seconds, 1 minute, 5 minutes, and so on. The performance parameter measurements may be received continuously or at any predetermined time period suitable for adequately monitoring the performance of the communication links, e.g. 5 seconds, 10 seconds, 30 seconds, 1 minute, 5 minutes, and so on.

Thus, the received performance parameter measurements provide an indication as to the performance, or status, of the one or more communication links between the management applications and the managed entities thereby enabling the performance or status of the one or more communication links to be monitored.

The method may further include processing the received performance parameter measurements in order to determine the current performance, or status, of the one or more communication links between the management applications and the managed entities.

The management applications may be based on a Network Management System (NMS) and enable various aspects of the network and the network entities to be effectively managed. The management applications will be specific to the type and purpose of the network. For example, in the area of telecommunications, the management applications may include a Hardware Manager (HwM), Software Manager (SwM), License Manager (LM) and so on. A person skilled in the art will appreciate and recognise the relevant management applications that would be necessary in order to effectively manage a given type of network.

The management applications may perform various management tasks. A management task may be any task that a management application may perform in order to manage various aspects of the network and the managed entities. A management task may therefore include communication with the managed entities in order to perform the management task. For example, in terms of a telecommunication network the SwM application may perform a software download, e.g. a management task, which involves data to be transmitted to the to one or more of the managed entities over the communication links. Other management tasks may require data from the managed entities and so on. In other words, a management task is a task or process that a respective management application performs in order to manage various aspects of the network and the managed entities.

An active management task is a management task that the respective management application is currently performing or executing and may therefore include current communication and data transfers with the managed entities over the communication links.

The managed entities are devices or apparatus that are deployed in a network.

Based on at least the received measured performance parameters, one or more system parameters can be adapted for the management applications that are performing one or more active management tasks. Accordingly, the embodiments of the present invention enable the communication between management applications and managed entities over the communication links to be more efficiently and effectively utilised. Moreover, by adapting the system parameters on a management application level or resolution then the utilisation of the communication links may be more accurately and effectively utilised reducing the occurrence of any performance or resource problems in the network.

The system parameters that may be tuned or adapted may include, for example, the transfer limit per management application, the bandwidth per management application, the number of management tasks which can be performed in parallel by the management applications on one or more of the communication links and so on.

The system parameters may also be adapted based on a priority mechanism. For example, a particular management application may be assigned a higher priority than other management applications and thus, may be allocated more resources, for example, more bandwidth and so on. The priority mechanism may further dynamically assign priorities to the management applications in order to ensure that a low priority management application is not prevented from receiving or being allocated sufficient resources to complete its active management task.

The step of adapting one or more system parameters for the one or more management applications is achieved by adapting one or more system parameters for the one or more active management tasks. Accordingly, the system parameters may be adapted on a per active management task resolution or level which may improve the control, efficiency and utilisation of the communication links. For example, if a particular management application is performing two active management tasks then the system parameters, e.g. the allocated bandwidth, can be adapted or set for each of the active management tasks.

The step of adapting the system parameters may also be based on a priority mechanism wherein each active management task may be assigned a priority level. Also, the priority may be assigned dynamically to ensure the lower priority level active management tasks are allocated appropriate resources to enable them to be completed.

Thus, in many of the embodiments the system parameters are adapted for each management application performing one or more active management tasks, for example, each management application performing an active management task may be allocated an overall bandwidth usage irrespective of the number of active management tasks the particular management application is performing. In many of the embodiments, the system parameters may be adapted for each active management task which, in turn, will effectively adapt or set the system parameters overall for the particular management application performing those active management tasks.

The method may further comprise the step of receiving a registration request from the one or more management applications.

The method may further comprise the steps of receiving a notification of one or more scheduled management tasks; and determining when to activate the one or more scheduled management tasks. Accordingly, any management tasks that are scheduled to be activated, e.g. executed, by a respective management application may be notified so that the optimum time at which to activate, e.g. execute, the scheduled management task can be determined.

The notification of a scheduled management task may be received from the management applications. Alternatively, the notification of a scheduled task may be received from a scheduler in a management system wherein the scheduler receives the notification of a scheduled task from the respective management applications.

The method may further comprise the step of determining information relating to each of the one or more scheduled management tasks; and wherein the step of determining when to activate the one or more scheduled management tasks is based on at least the determined information relating to each of the scheduled management tasks and the one or more received performance parameter measurements.

In order to determine when to activate or execute a scheduled management task, information, for example, an estimated operation time of the management task, an estimated bandwidth usage required by the management task, an estimated throughput for the management task and so on, relating to the scheduled management task may be determined. The determined information relating to the management task may be used along with the received performance parameter measurements, for example, the current bandwidth usage and the current throughput on the communication links, to determine when to activate each scheduled management task so that the communication links are efficiently and effectively utilised.

The determination of when to activate the one or more scheduled management tasks may be further based on a priority mechanism. Thus, a priority level may be assigned to the scheduled management tasks where a higher priority level may be activated ahead of a lower level priority scheduled management task. The priority mechanism may dynamically assign priority levels to the scheduled management tasks in order to ensure that none of the scheduled management tasks are prevented from activating.

When determining when to activate a scheduled management task the system parameters for the scheduled management task may be adapted or allocated. The system parameters for each scheduled management task may be adapted or allocated based on one or more of the current performance of the communication links (as indicated by the received performance parameter measurements), the assigned priority, the system parameters currently adapted or allocated to active management tasks, the system parameters adapted or allocated to other scheduled management tasks and the time at which scheduled management tasks are scheduled for activation.

The method may further comprise the step of instructing the respective management application as to when to activate their scheduled management. The respective management application may be instructed directly as to when to activate their scheduled management task. Alternatively, the respective management application may be instructed as to when to activate their scheduled management task via the scheduler.

The one or more system parameters may be adapted within a predefined criteria. The predefined criteria may be used in order to ensure that the available bandwidth or the throughput on the communication links does not exceed a maximum value that the communication links can support. For example, the predefined criteria may include a percentage of communication link usage either per communication link, per management application and/or per active management task, the priority of the management application and/or the management task, the amount of data which has to be sent or received by a management application and/or management tasks.

According to a second aspect of the present invention there is provided an apparatus comprising: a first input adapted to receive one or more performance parameter measurements wherein the one or more performance parameters relate to one or more communication links between one or more management applications and one or more managed entities, and the one or more performance parameters provide an indication of a performance of the one or more communication links; and a first processor adapted to adapt one or more system parameters for the one or more management applications which are performing one or more active management tasks based on the received one or more performance parameters relating to the one or more communication links.

According to a third aspect of the present invention there is provided an apparatus that is adapted to receive one or more performance parameter measurements wherein the one or more performance parameters relate to one or more communication links between one or more management applications and one or more managed entities, and the one or more performance parameters provide an indication of a performance of the one or more communication links; and adapt one or more system parameters for the one or more management applications which are performing one or more active management tasks based on the received one or more performance parameters relating to the one or more communication links.

Accordingly, the apparatus receives performance parameter measurements which provide an indication of the current performance of the communication links between the management applications and managed entities. Based on at least the received performance parameter measurements the system parameters can be adapted for each of the management applications performing at least one active management task so that the communication links can be effectively and efficiently utilised thereby reducing the occurrence of performance or resource problems.

The first processor adapts one or more system parameters for the one or more management applications by adapting one or more system parameters for the one or more active management tasks. Thus, the apparatus may adapt the system parameters on an active management task resolution to further improve the efficiency and effective utilisation of the communication links. By adapting the system parameters on a per active management task resolution then the system parameters for each management application performing one or more active management tasks are adapted.

The apparatus may further comprise a second input adapted to receive a registration request from the one or more management applications.

The apparatus may further comprise a third input adapted to receive a notification of one or more scheduled management tasks; and a second processor adapted to determine when to activate the one or more scheduled management tasks.

The second processor is further adapted to determine information relating to each of the one or more scheduled management tasks; and wherein the second processor determines when to activate the one or more scheduled management tasks based on at least the determined information relating to each of the scheduled management tasks and the one or more performance parameters.

The second processor is further adapted to instruct the respective management application as to when to activate their scheduled management task.

The first processor adapts one or more system parameters within a predefined criteria.

The apparatus may be a computing device. The apparatus may be a server. The apparatus may be adapted using hardware, software or any combination thereof.

According to a fourth aspect of the present invention there is provided a computer program product comprising computer readable executable code for receiving one or more performance parameter measurements wherein the one or more performance parameters relate to one or more communication links between one or more management applications and one or more managed entities, and the one or more performance parameters provide an indication of a performance of the one or more communication links; and adapting one or more system parameters for the one or more management applications which are performing one or more active management tasks based on the received one or more performance parameters relating to the one or more communication links.

The computer program product may further comprise computer readable executable code for performing any or all of the functions in accordance with the aspects of the invention.

Embodiments of the present invention will now be described, by way of example only, and with reference to the accompanying drawings, in which.

As described hereinabove, the improvement provided by the embodiments to the communication between entities and management applications may be applied to any large scale network or system where entities are managed by a management system.

An example of the embodiments of the present invention will now be described in relation to telecommunication networks. A telecommunication network typically comprises a substantial number of network elements providing various functionalities and management systems to control and manage those network elements.

Figure 1:
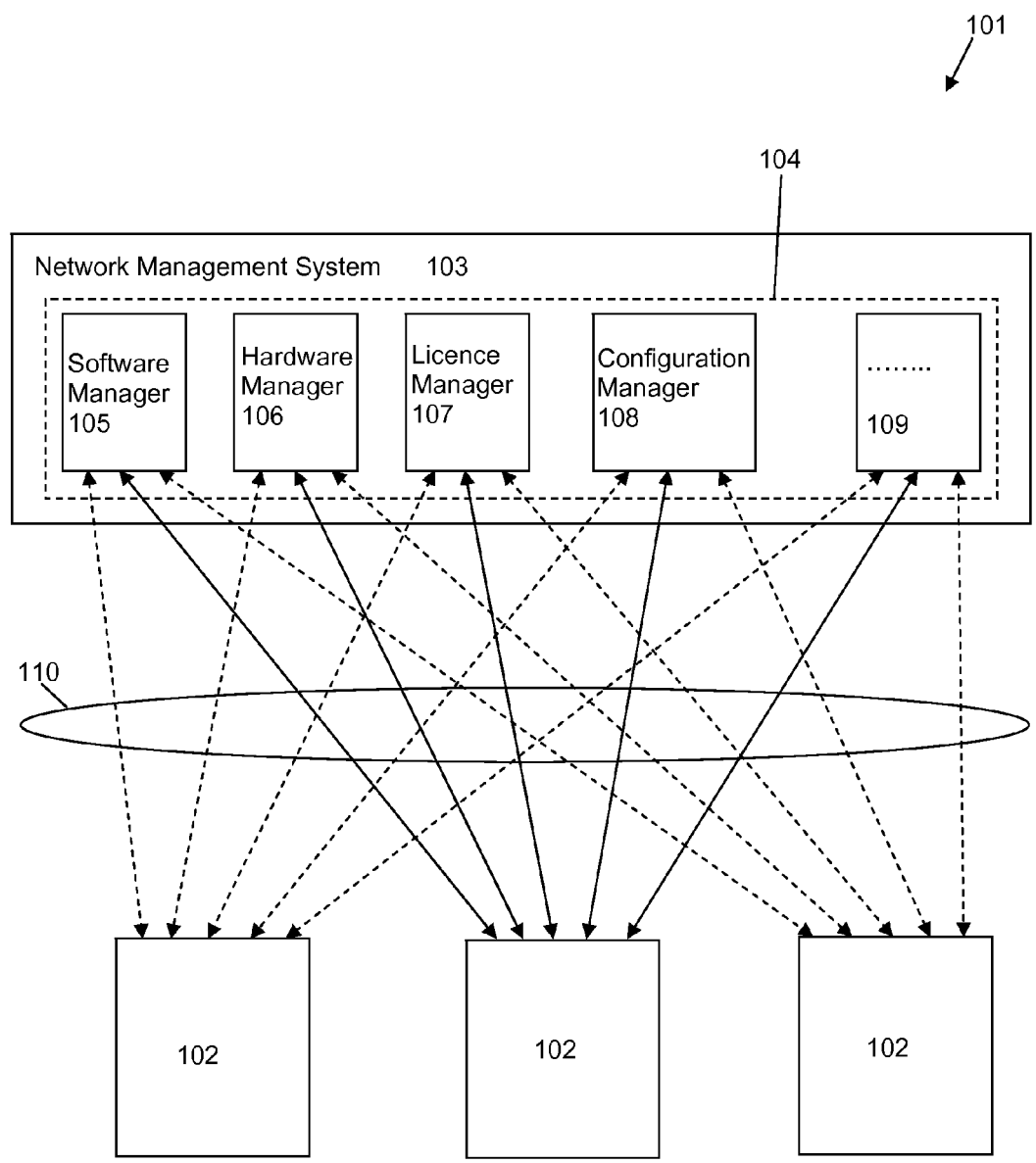
FIG. 1 is a simplified block diagram of a network in accordance with embodiments of the present invention.

FIG. 1 shows a block diagram of a network 101 in accordance with many of the embodiments of the present invention. The network 101 comprises a plurality of network elements 102 and a Network Management System (NMS) 103.

The NMS 103 may include various management applications 104 where the management applications 104 manage and control various aspects of the telecommunication network and network elements 102. In this example of the network 101 being a telecommunication network then the management applications 104 may include, for example, applications for Software Management 105, Hardware Management 106, License Management 107, Configuration Management 108 along with any number of further management applications 109 necessary to manage and control the associated network. For example, further management applications 109 in this example of a telecommunication network may include Performance Management, Fault Management and so on.

One or more of the management applications 104 may need to communicate with one or more of the network elements 102 to receive data from or send data to the network elements 102 in order to perform management tasks to manage various aspects of the network and the network elements. The management applications 104 may communicate with the network elements 102 over communication links 110.

Figure 2:
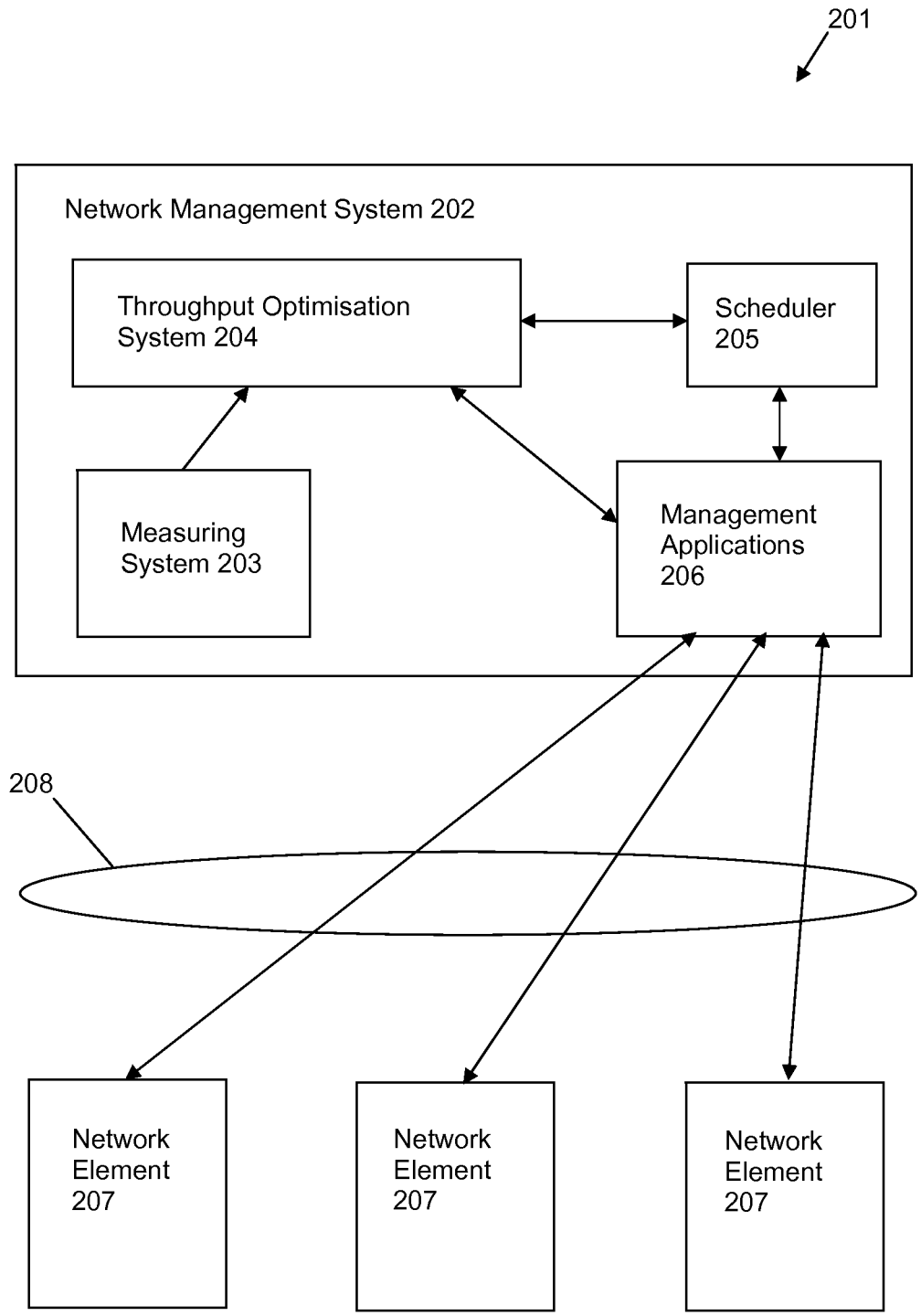
FIG. 2 shows a simplified block diagram of a network in accordance with embodiments of the present invention.

FIG. 2 shows a simplified system 201 in accordance with many of the embodiments. The embodiments will be described in relation to telecommunication networks but as discussed hereinabove the embodiments of the present invention may be applied to any large scale system or network which includes a management system and network entities.

In the example shown in FIG. 2, the system 201 includes a Network Management System (NMS) 202 and one or more Network Elements (NE) 207. The NMS 202 may include a measuring system 203, a throughput optimisation system 204 and a scheduler 205. In this example, the measuring system 203, the throughput optimisation system 204 and the scheduler 205 are shown as separate components however, one or more of these components may be integrated together to form one or more combined components.

The management applications 206, which may include for example, hardware manager, software manager, license manager and so on, register with the throughput optimisation system 204. The management applications 206 may register with the throughput optimisation system 204 by sending a registration request to the throughput optimisation system 204. The management applications 206 may also register each active management task that the management applications 206 are executing. An active management task is one that the corresponding management application is currently performing, for example, a software manager application may be currently performing or executing a software download to one or more NEs 207 and this process of downloading the software is an active management task.

The measuring system 203 may take or receive network measurements relating to performance parameters, for example, the current bandwidth usage and/or throughput on the communication links 208 between the NMS 202 and the managed NEs 207.

The performance parameters may be defined as Key Performance Indicators (KPI) and the measuring system 203 may measure common KPIs defined for all management applications 206, for example, usage of a communication link, available bandwidth on one or more of the communication links, communication link quality (e.g. number of lost packages) on one or more of the communication links, and so on. The common KPIs measured by the measurement system 203 may be measured for all applications without differentiation on management task level and/or management application level.

Furthermore, each of the management applications may also define its own performance parameters, e.g. its own specific KPIs which may be based on, for example, the communication link parameters, the number of communication links and so on. The management application specific KPIs may be related to the defined common KPIs or may be independent or separate KPIs specific to the particular management application. In respect of the management application specific KPIs then the particular management application may take the appropriate measurements and provide them to the measuring system 203. Thus, the measurements taken or obtained by the management applications are based on the management task level and/or on the management application level which may then be forwarded to the measuring system 203.

The performance parameters measured by the measuring system 203 and the performance parameters received by the measuring system 203 from the management applications 206 are provided to the throughput optimisation system 204. Thus, the throughput optimisation system 204 is able to monitor the performance, for example, the current bandwidth usage and the current throughput on the communication links. The throughput optimisation system 204 may continuously receive the measurements relating to the defined performance parameters. However, as will be appreciated the performance parameters may be measured and/or provided to the throughput optimisation system 204 at any time period that enables the performance to be adequately measured and monitored. For example, the defined performance parameters may be measurements every 10 seconds, every 30 seconds, every minute, every 5 minutes and so on. Similarly, the measured performance parameters may be provided to the throughput optimisation system every 10 seconds, every 30 seconds, every minute, every 5 minutes and so on.

The throughput optimisation system 204 may control and adapt various system parameters to more effectively and efficiently utilise the communication links thereby reducing occurrences of performance and resource problems. For example, the system parameters that may be tuned or adapted may include the transfer limit per management task and/or per management application, the bandwidth per management task and/or per management application, the number of management tasks which can be performed in parallel on one or more of the communication links and so on. Thus, the throughput optimisation system 204 may control the bandwidth usage and throughput between the NMS 202 and the NEs 207 by tuning, at a single maintained entity resolution, the system parameters in order to ensure that the available bandwidth is not exceeded according to predefined criteria. For example, the predefined criteria may include a percentage of communication link usage, the priority of the management task and/or management application, the amount of data which has to be sent or received by a management task and/or a management application.

The management applications 206 may further register with the throughput optimisation system 204 management tasks that are scheduled by each particular management application. The management applications 206 may register their scheduled management tasks directly with the throughput optimisation system 204 or via a scheduler component 205.

The throughput optimisation system 204 may then determine when each of the registered scheduled management tasks will be activated and the order in which the registered scheduled management tasks may be activated. The throughput optimisation system 204 may also determine the system parameters adapted for or allocated to each scheduled management task, e.g. the amount of bandwidth allocated to each task, based on, for example, actual network measurements relating to the communication links 208 between the NMS 202 and the relevant network elements 207.

The throughput optimisation system 204 may then inform each management application 206 either directly or via the scheduler 205 as to when their respective scheduled management tasks can be activated, e.g. executed or activated by the respective management application.

The throughput optimisation system 204 may determine information relating to each scheduled management task which may also be used to determine when to activate each scheduled management task. The information relating to each scheduled management task that is determined may include the estimated operation time of each task, e.g. the estimated length of time that each task will take to complete. For example, if the scheduled management task relates to a file transfer or software download then the estimated length of time may be determined based on the current available bandwidth and the file size. In a further example, of a request for data between the management applications and one or more NEs then the estimated length of time may be determined based on, for example, the number of requests involved, the size of request for data and so on. As will be appreciated, the estimated length of time necessary to complete a scheduled management task may be determined from the nature or type of the management task along with any relevant parameters.

The information that may be determined by the throughput optimisation system 204 may also include a determination of the estimated bandwidth usage and/or throughput that each scheduled management task may require, e.g. the estimated amount of data exchange needed with the NEs 207. For example, the estimated bandwidth usage and/or throughput may be determined based on a history of the management task and the availability of the communication link. The throughput optimisation system 204 may also check for possible bottlenecks in the entire path between the NMS 202 and the NEs 207 based on existing IP (Internet Protocol) measurement methods. As will be appreciated, the estimated bandwidth usage and/or throughput may be determined from the nature or type of the management task along with any relevant parameters.

The throughput optimisation system 204 can therefore take into account or consideration one or both of the estimated operation time and the estimated bandwidth usage and/or throughput when determining the order in which the scheduled tasks should be activated. Thus, based on the current bandwidth usage and/or throughput on the communication links 208 between the NMS 202 and the NEs 207 and on the determined information relating to each scheduled management task the throughput optimisation system 204 can make an optimum and most efficient determination as to when each of the scheduled management tasks should be activated, e.g. executed, by the relevant management application in order to efficiently utilise the available communication links 208 and reduce performance and resource problems. This may further enhance the efficiency and utilisation of the bandwidth on a per management application level and/or on a per management task level between the NMS 202 and the NEs 207.

The throughput optimisation system 204 may also support or implement a priority mechanism for each scheduled management task. The priority mechanism may relate to predefined priority criteria, for example, the importance of the management task, the importance of the relevant management application, the related severity of the management task and so on. The assigned priorities may be changed dynamically by the throughput optimisation system 204 so as to avoid the situation where one or more of the management tasks may be ignored or prevented from executing or activating.

Based on the priority mechanism, the throughput optimisation system 204 may, for example, prevent a low priority scheduled management task from executing if the determined bandwidth usage and throughput is currently high or if another higher priority management task is scheduled. Thus, the throughput optimisation system 204 can also take into account or consideration the priority level of the scheduled management task when determining the order in which the scheduled management tasks are to be performed.

The throughput optimisation system 204 may also set predetermined criteria for bandwidth usage in the network. For example, the predetermined criteria may include the number of management tasks to be activated or executed, the priorities assigned to the management tasks and/or the management applications, the estimated length of time for performing the management task and so on.

For example, the throughput optimisation system 204 may predefine a maximum available bandwidth percentage that can be used in the network for the management applications 206 to communicate with the NEs 207. The throughput optimisation system 204 may set predefined limits on the amount of bandwidth a particular management application may be allocated or may set predefined limits on the amount of bandwidth a particular priority level task may be allocated. In other words, the throughput optimisation system 204 may set predetermined criteria in relation to the bandwidth usage each of the network management applications or their tasks may be allocated in order to more effectively and efficiently utilise the communication links 208 between the NEs 207 and the NMS 202.

The throughput optimisation system 204 may further record information relating to the monitored bandwidth usage and throughput in the network between the management applications 206 and the NEs 207. The information recorded may be on a per task level and/or a per management application level. The information recorded may then be used for analysing the network usage or for trouble shooting should any performance problems occur such as over allocating capacity.

The throughput optimisation system 204 may also use the recorded information to generate reports and to raise any alarms, based on predetermined alarm criteria. Thus, an alarm may be raised if any predetermined alarm criteria is met, for example, a small number of tasks having an excessive or substantial communication link usage, a predefined number of management tasks waiting to be activated or executed, a predefined substantial amount of traffic (e.g. communication link usage) for a predefined time period.

If the throughput optimisation system 204 identifies or determines an alarm condition in the network then the throughput optimisation system 204 may inform or indicate to an alarm handling component in the NMS 203 of the alarm condition so the alarm handling component can take the appropriate action. The alarm handling component may be a component of the throughput optimisation system 204 or may be a standard component in the NMS, e.g. the Fault Management (FM) application.

Accordingly, in many of the embodiments of the present invention the bandwidth available and throughput on the communication link between management applications and controlled or managed entities, e.g. NEs can be monitored and measured on a management application level and/or a management application task level. This enables the efficient and effective use of the communication links to significantly reduce any performance and resource problems such as "bottlenecks", lack of bandwidth at any given time and so on. This is because the throughput optimisation system can tune or adapt the network parameters to ensure that the communication links are not over utilised. The throughput optimisation system can also determine the order in which the management application tasks are executed so that performance and resource problems can be avoided.

Many of the embodiments of the present invention have several advantages. For example, by monitoring and measuring the bandwidth that is available on the communication links to controlled entities enables the source of performance and resource problems to be identified. Furthermore, by controlling the data throughput from the management applications to the NEs during data upload/download operations then any overload situations can be avoided which improves the network operation and network quality.

Thus, many of the embodiments provide a self adaptable and self maintained mechanism to control data exchange between systems and controlled entities. As described hereinabove, the embodiments of the present invention may be applied to any network where data exchange occurs between a system, e.g. a management system, and controlled entities so that it is not limited to telecommunication networks.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising:
   receiving by one or more processors of a network management system, one or more performance parameters that are related to and indicate a performance of one or more communication links between one or more management applications and one or more managed entities;
   receiving by the one or more processors, a notification of one or more scheduled management tasks;
   determining when to activate said one or more scheduled management tasks;
   instructing said one or more management applications that said one or more active management tasks can be activated;
   tuning one or more system parameters for said one or more management applications which are performing said one or more active management tasks based on said received one or more performance parameters, the one or more system parameters includes at least one of: a transfer limit of one of the active management tasks, a transfer limit of one of the management applications, a bandwidth of one of the active management tasks, and a bandwidth of one of the management applications; and
   applying the one or more tuned system parameters to the one or more management applications which are performing the one or more active management tasks on the one or more managed entities over said one or more communications links.

2. The method as claimed in claim 1, in which said tuning one or more system parameters for said one or more management applications is achieved by tuning one or more system parameters for said one or more active management tasks.

3. The method as claimed in claim 1 further comprising:
   receiving a registration request from said one or more management applications.

4. The method as claimed in claim 1 further comprising:
   determining information relating to each of said one or more scheduled management tasks; and
   wherein said determining when to activate said one or more scheduled management tasks is based on at least said determined information relating to each of said scheduled management tasks and said one or more performance parameters.

5. The method as claimed in claim 1 in which said one or more system parameters are configured within a predefined criteria.

6. An network management system apparatus comprising:
   at least one memory comprising computer program code;
   at least one processor;
   wherein the at least one memory and the computer program code are configured, with the at least one processor, to cause the apparatus at least to:
   receive by the at least one processor, one or more performance parameters that are related to and indicate a performance of one or more communication links between one or more management applications and one or more managed entities,
   receive by the at least one processor, a notification of one or more scheduled management tasks:
   determine when to activate said one or more scheduled management tasks;
   instruct said one or more management applications that said one or more active management tasks can be activated;
   tune one or more system parameters for said one or more management applications which are performing said one or more active management tasks based on said received one or more performance parameters, wherein the one or more system parameters includes at least one of: a transfer limit of one of the active management tasks, a transfer limit of one of the management applications, a bandwidth of one of the active management tasks, and a bandwidth of one of the management applications; and
   apply the one or more tuned system parameters to the one or more management applications which are performing the one or more active management tasks on the one or more managed entities over said one or more communications links.

7. The apparatus as claimed in claim 6, in which said first processor tunes one or more system parameters for said one or more management applications by tuning one or more system parameters for said one or more active management tasks.

8. The apparatus as claimed in claim 6 further comprising:
   a processor configured to receive a registration request from said one or more management applications.

9. The apparatus as claimed in claim 6 in which said at least one processor is further configured to determine information relating to each of said one or more scheduled management tasks; and
   wherein said at least one processor determines when to activate said one or more scheduled management tasks based on at least said determined information relating to each of said scheduled management tasks and said one or more performance parameters.

10. The apparatus as claimed in claim 6 in which said first processor tunes one or more system parameters within a predefined criteria.

11. A non-transitory computer-readable medium encoding instructions that, when executed in hardware, perform a process comprising:
    receiving by one or more processors of a network management system, one or more performance parameters that are related to and indicate a performance of one or more communication links between one or more management applications and one or more managed entities;
    receiving by the one or more processors, a notification of one or more scheduled management tasks;
    determining when to activate said one or more scheduled management tasks;
    instructing said one or more management applications that said one or more active management tasks can be activated;
    tuning one or more system parameters for said one or more management applications which are performing said one or more active management tasks based on said received one or more performance parameters, wherein the one or more system parameters includes at least one of: a transfer limit of one of the active management tasks, a transfer limit of one of the management applications, a bandwidth of one of the active management tasks, and a bandwidth of one of the management applications; and
    applying the one or more tuned system parameters to the one or more management applications which are performing the one or more active management tasks on the one or more managed entities over said one or more communications links.

* * * * *